(12) United States Patent
Kunugi

(10) Patent No.: US 10,569,603 B2
(45) Date of Patent: Feb. 25, 2020

(54) PNEUMATIC TIRE

(71) Applicant: The Yokohama Rubber Co., LTD., Minato-ku, Tokyo (JP)

(72) Inventor: Tsuyoshi Kunugi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1117 days.

(21) Appl. No.: 14/786,530

(22) PCT Filed: Apr. 22, 2014

(86) PCT No.: PCT/JP2014/061318
§ 371 (c)(1),
(2) Date: Oct. 22, 2015

(87) PCT Pub. No.: WO2014/175276
PCT Pub. Date: Oct. 30, 2014

(65) Prior Publication Data
US 2016/0068023 A1    Mar. 10, 2016

(30) Foreign Application Priority Data

Apr. 23, 2013    (JP) .................................. 2013-090704

(51) Int. Cl.
*B60C 11/00* (2006.01)
*B60C 11/01* (2006.01)
(Continued)

(52) U.S. Cl.
CPC ............... *B60C 11/00* (2013.01); *B60C 3/04* (2013.01); *B60C 9/20* (2013.01); *B60C 9/28* (2013.01);
(Continued)

(58) Field of Classification Search
CPC ..... B60C 11/1376; B60C 11/00; B60C 11/08; B60C 11/01; B60C 2011/0016;
(Continued)

(56) References Cited

U.S. PATENT DOCUMENTS

| 5,616,195 A | 4/1997 | Marquet et al. |
| 2006/0169381 A1 | 8/2006 | Radulescu et al. |

(Continued)

FOREIGN PATENT DOCUMENTS

| CN | 101264720 | 9/2008 | |
| EP | 0285695 A1 * | 10/1988 | ............. B60C 11/00 |

(Continued)

OTHER PUBLICATIONS

Machine translation of JP02-179508 (no date).*

(Continued)

*Primary Examiner* — Justin R Fischer
*Assistant Examiner* — Philip N Schwartz
(74) *Attorney, Agent, or Firm* — Thorpe North & Western

(57) ABSTRACT

This pneumatic tire (1) has a first profile (PL1) wherein land sections (3) located further inside in the tire width direction than right and left outermost circumferential main grooves (2) protrudes outward in the tire radius direction. In addition, the pneumatic tire has a second profile (PL2) wherein shoulder land sections (3) protrudes inward in the tire radius direction within a ground contact surface. The distance d in the tire radial direction from a line extending from the first profile (PL1) to the second profile (PL2) within the ground contact surface increases toward the outer side in the tire width direction. In addition, the distance (Gcc) from a tread profile (first profile (PL1)) within a tire equatorial plane (CL) to a tire inner circumferential surface and the distance (Gsh) from a tread end (P) to the tire inner circumferential surface have the relationship of $1.10 \leq Gsh/Gcc$.

17 Claims, 11 Drawing Sheets

(51) Int. Cl.
  *B60C 9/28* (2006.01)
  *B60C 3/04* (2006.01)
  *B60C 9/20* (2006.01)
  *B60C 11/13* (2006.01)
  *B60C 11/03* (2006.01)

(52) U.S. Cl.
  CPC .......... *B60C 11/0008* (2013.01); *B60C 11/01* (2013.01); *B60C 11/1376* (2013.01); *B60C 2009/2016* (2013.01); *B60C 2011/0016* (2013.01); *B60C 2011/0033* (2013.01); *B60C 2011/0339* (2013.01)

(58) Field of Classification Search
  CPC ..... B60C 2011/0339; B60C 2011/0033; B60C 9/20; B60C 9/28; B60C 2009/2016; B60C 3/04
  USPC .................................................... 152/209.15
  See application file for complete search history.

(56) References Cited

U.S. PATENT DOCUMENTS

| | | |
|---|---|---|
| 2008/0223495 A1 | 9/2008 | Ikeda et al. |
| 2011/0220259 A1 | 9/2011 | Suzuki et al. |
| 2012/0097307 A1* | 4/2012 | Delebecq .................. B60C 3/04 152/527 |
| 2012/0194076 A1 | 8/2012 | Murata |
| 2015/0101727 A1 | 4/2015 | Hamanaka |
| 2015/0114536 A1* | 4/2015 | Hamanaka .......... B60C 11/0083 152/209.18 |
| 2015/0151581 A1* | 6/2015 | Kunugi .............. B60C 11/0083 152/209.18 |
| 2015/0273943 A1* | 10/2015 | Kotoku ................. B60C 9/2006 152/209.18 |
| 2015/0298505 A1 | 10/2015 | Iga |
| 2015/0328930 A1* | 11/2015 | Kobayashi .............. B60C 11/04 152/209.18 |

FOREIGN PATENT DOCUMENTS

| | | | |
|---|---|---|---|
| JP | 02179508 A * | 7/1990 | ......... B60C 11/0309 |
| JP | H0466304 | 3/1992 | |
| JP | H0516608 | 1/1993 | |
| JP | H071916 | 1/1995 | |
| JP | H0867111 | 3/1996 | |
| JP | H11198607 | 7/1999 | |
| JP | H11512050 | 10/1999 | |
| JP | 2002225514 | 8/2002 | |
| JP | 2006528103 | 12/2006 | |
| JP | 2007203970 | 8/2007 | |
| JP | 2007326392 | 12/2007 | |
| JP | 2010-012978 | 1/2010 | |
| JP | 2010012978 | 2/2010 | |
| JP | 2010149842 | 7/2010 | |
| JP | 4553064 B2 | 9/2010 | |
| JP | 2012144096 | 8/2012 | |
| JP | 5182453 | 4/2013 | |
| JP | 5182454 | 4/2013 | |
| WO | WO 1997/007996 | 3/1997 | |
| WO | WO 2005/016667 | 2/2005 | |
| WO | WO 2010/058857 | 5/2010 | |
| WO | WO 2014/010091 | 1/2014 | |
| WO | WO 2014/010092 | 1/2014 | |
| WO | WO2014-010351 * | 1/2014 | ......... B60C 11/0083 |
| WO | WO2014-057552 * | 4/2014 | ........... B60C 9/2006 |

OTHER PUBLICATIONS

Machine translation of JP11-198607 (no date).*
Machine translation of JP2007-203970 (no date).*
International Search Report for International Application No. PCT/JP2014/061318 dated Jul. 22, 2014, 5 pages, Japan.

* cited by examiner

COMPARATIVE EXAMPLE
(De/Dcc=1.00, Gsh/Gcc=1.06)

WORKING EXAMPLE
(De/Dcc=1.00, Gsh/Gcc=1.20)

| | CONVENTIONAL EXAMPLE | COMPARATIVE EXAMPLE | WORKING EXAMPLE 1 | WORKING EXAMPLE 2 | WORKING EXAMPLE 3 | WORKING EXAMPLE 4 |
|---|---|---|---|---|---|---|
| FIRST PROFILE | PROTRUDING OUTWARD | PROTRUDING OUTWARD | PROTRUDING OUTWARD | PROTRUDING OUTWARD | PROTRUDING OUTWARD | PROTRUDING OUTWARD |
| SECOND PROFILE | PROTRUDING OUTWARD | PROTRUDING INWARD | PROTRUDING INWARD | PROTRUDING INWARD | PROTRUDING INWARD | PROTRUDING INWARD |
| Gsh/Gcc | 1.05 | 1.05 | 1.10 | 1.10 | 1.15 | 1.20 |
| De/Dcc | 1.00 | 1.00 | 0.70 | 0.98 | 1.10 | 1.30 |
| (D1 − D2)/D1 | 0.020 | 0.018 | 0.015 | 0.015 | 0.015 | 0.015 |
| Wb2/Wca | 0.80 | 0.80 | 0.80 | 0.80 | 0.80 | 0.80 |
| Yc/Ya | 0.88 | 0.88 | 0.88 | 0.88 | 0.88 | 0.88 |
| Yd/Ya | 0.99 | 0.99 | 0.99 | 0.99 | 0.99 | 0.99 |
| ANGLE OF LARGE-ANGLE BELT [deg] | 50 | 50 | 50 | 50 | 50 | 50 |
| Wb1/Wb3 | 0.80 | 0.80 | 0.80 | 0.80 | 0.80 | 0.80 |
| Wsh/TW | 0.10 | 0.10 | 0.10 | 0.10 | 0.10 | 0.10 |
| Wg/Wca | 0.64 | 0.64 | 0.64 | 0.64 | 0.64 | 0.64 |
| TREAD RUBBER HARDNESS | 60 | 60 | 60 | 60 | 60 | 60 |
| CHAMFERED PORTION | NO | NO | NO | NO | NO | NO |
| BUTTRESS PORTION NARROW GROOVE | NO | NO | NO | NO | NO | NO |
| TW/SW | 0.92 | 0.92 | 0.92 | 0.92 | 0.92 | 0.92 |
| TW/Wca | 0.96 | 0.96 | 0.96 | 0.96 | 0.96 | 0.96 |
| UNEVEN WEAR RESISTANCE PERFORMANCE | 100 | 102 | 103 | 105 | 104 | 103 |

FIG. 9A

|  | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 |
|---|---|---|---|---|---|---|
| FIRST PROFILE | PROTRUDING OUTWARD | PROTRUDING OUTWARD | PROTRUDING OUTWARD | PROTRUDING OUTWARD | PROTRUDING OUTWARD | PROTRUDING OUTWARD |
| SECOND PROFILE | PROTRUDING INWARD | PROTRUDING INWARD | PROTRUDING INWARD | PROTRUDING INWARD | PROTRUDING INWARD | PROTRUDING INWARD |
| Gsh/Gcc | 1.20 | 1.20 | 1.20 | 1.20 | 1.20 | 1.20 |
| De/Dcc | 1.00 | 1.00 | 1.00 | 1.00 | 1.00 | 1.00 |
| (D1 − D2)/D1 | 0.013 | 0.013 | 0.013 | 0.013 | 0.013 | 0.010 |
| Wb2/Wca | 0.80 | 0.70 | 0.85 | 0.93 | 0.70 | 0.70 |
| Yc/Ya | 0.88 | 0.88 | 0.88 | 0.88 | 0.90 | 0.80 |
| Yd/Ya | 0.99 | 0.99 | 0.99 | 0.99 | 0.99 | 0.99 |
| ANGLE OF LARGE-ANGLE BELT [deg] | 50 | 50 | 50 | 50 | 50 | 50 |
| Wb1/Wb3 | 0.80 | 0.80 | 0.80 | 0.80 | 0.80 | 0.80 |
| Wsh/TW | 0.10 | 0.10 | 0.10 | 0.10 | 0.10 | 0.10 |
| Wg/Wca | 0.64 | 0.64 | 0.64 | 0.64 | 0.64 | 0.64 |
| TREAD RUBBER HARDNESS | 60 | 60 | 60 | 60 | 60 | 60 |
| CHAMFERED PORTION | NO | NO | NO | NO | NO | NO |
| BUTTRESS PORTION NARROW GROOVE | NO | NO | NO | NO | NO | NO |
| TW/SW | 0.92 | 0.92 | 0.92 | 0.92 | 0.92 | 0.92 |
| TW/Wca | 0.96 | 0.96 | 0.96 | 0.96 | 0.96 | 0.96 |
| UNEVEN WEAR RESISTANCE PERFORMANCE | 105 | 104 | 105 | 106 | 106 | 107 |

FIG. 9B

|  | WORKING EXAMPLE 11 | WORKING EXAMPLE 12 | WORKING EXAMPLE 13 | WORKING EXAMPLE 14 | WORKING EXAMPLE 15 |
|---|---|---|---|---|---|
| FIRST PROFILE | PROTRUDING OUTWARD | PROTRUDING OUTWARD | PROTRUDING OUTWARD | PROTRUDING OUTWARD | PROTRUDING OUTWARD |
| SECOND PROFILE | PROTRUDING INWARD | PROTRUDING INWARD | PROTRUDING INWARD | PROTRUDING INWARD | PROTRUDING INWARD |
| Gsh/Gcc | 1.20 | 1.20 | 1.20 | 1.20 | 1.20 |
| De/Dcc | 1.00 | 1.00 | 1.00 | 1.00 | 1.00 |
| (D1 − D2)/D1 | 0.013 | 0.013 | 0.013 | 0.013 | 0.013 |
| Wb2/Wca | 0.70 | 0.70 | 0.70 | 0.70 | 0.70 |
| Yc/Ya | 0.80 | 0.80 | 0.80 | 0.80 | 0.80 |
| Yd/Ya | 1.02 | 0.95 | 0.95 | 0.95 | 0.95 |
| ANGLE OF LARGE-ANGLE BELT [deg] | 50 | 50 | 70 | 70 | 70 |
| Wb1/Wb3 | 0.80 | 0.80 | 0.80 | 0.90 | 0.90 |
| Wsh/TW | 0.10 | 0.10 | 0.10 | 0.10 | 0.20 |
| Wg/Wca | 0.64 | 0.64 | 0.64 | 0.64 | 0.64 |
| TREAD RUBBER HARDNESS | 60 | 60 | 60 | 60 | 60 |
| CHAMFERED PORTION | NO | NO | NO | NO | NO |
| BUTTRESS PORTION OR NARROW GROOVE | NO | NO | NO | NO | NO |
| TW/SW | 0.92 | 0.92 | 0.92 | 0.92 | 0.92 |
| TW/Wca | 0.96 | 0.96 | 0.96 | 0.96 | 0.96 |
| UNEVEN WEAR RESISTANCE PERFORMANCE | 106 | 107 | 108 | 109 | 110 |

FIG. 10A

|  | WORKING EXAMPLE 16 | WORKING EXAMPLE 17 | WORKING EXAMPLE 18 | WORKING EXAMPLE 19 |
|---|---|---|---|---|
| FIRST PROFILE | PROTRUDING OUTWARD | PROTRUDING OUTWARD | PROTRUDING OUTWARD | PROTRUDING OUTWARD |
| SECOND PROFILE | PROTRUDING INWARD | PROTRUDING INWARD | PROTRUDING INWARD | PROTRUDING INWARD |
| Gsh/Gcc | 1.20 | 1.20 | 1.20 | 1.20 |
| De/Dcc | 1.00 | 1.00 | 1.00 | 1.00 |
| (D1 − D2)/D1 | 0.013 | 0.013 | 0.013 | 0.013 |
| Wb2/Wca | 0.70 | 0.70 | 0.70 | 0.70 |
| Yc/Ya | 0.80 | 0.80 | 0.80 | 0.80 |
| Yd/Ya | 0.95 | 0.95 | 0.95 | 0.95 |
| ANGLE OF LARGE-ANGLE BELT [ deg ] | 70 | 70 | 70 | 70 |
| Wb1/Wb3 | 0.90 | 0.90 | 0.90 | 0.90 |
| Wsh/TW | 0.20 | 0.20 | 0.20 | 0.20 |
| Wg/Wca | 0.84 | 0.84 | 0.84 | 0.84 |
| TREAD RUBBER HARDNESS | 60 | 68 | 68 | 68 |
| CHAMFERED PORTION | NO | NO | YES | YES |
| BUTTRESS PORTION OR NARROW GROOVE | NO | NO | NO | YES |
| TW/SW | 0.92 | 0.92 | 0.92 | 0.92 |
| TW/Wca | 0.96 | 0.96 | 0.96 | 0.96 |
| UNEVEN WEAR RESISTANCE PERFORMANCE | 111 | 112 | 113 | 114 |

FIG. 10B

PNEUMATIC TIRE

TECHNICAL FIELD

The present technology relates to a pneumatic tire, and particularly relates to a pneumatic tire with enhanced uneven wear resistance performance.

BACKGROUND

Conventionally, when a tire mainly used for high-speed continuous travel, such as line hauling, is used under free rolling usage conditions, uneven wear occurs in land portions in the shoulder regions of the tread portion. Technology for a conventional pneumatic tire that addresses this issue is described in Japanese Patent No. 4553064.

SUMMARY

The present technology provides a pneumatic tire with enhanced uneven wear resistance performance.

A pneumatic tire pertaining to the technology includes a carcass layer, a belt layer arranged on an outer side of the carcass layer in a tire radial direction, a tread rubber arranged on an outer side of the belt layer in the tire radial direction, at least three circumferential main grooves extending in a tire circumferential direction, and a plurality of land portions formed by being partitioned by the circumferential main grooves. Among the circumferential main grooves, left and right circumferential main grooves on outermost sides in a tire width direction are referred to as outermost circumferential main grooves. Also, the land portions on an outer side of the outermost circumferential main grooves on left and right sides in the tire width direction are referred to as shoulder land portions. The land portions on an inner side of the outermost circumferential main grooves on the left and right sides in the tire width direction have a first profile that protrudes outward in the tire radial direction, and the shoulder land portions have a second profile that protrudes inward in the tire radial direction within a ground contact surface. A distance d in the tire radial direction between a line extending from the first profile and the second profile, within the ground contact surface of the shoulder land portions, increases toward an outer side in the tire width direction. Additionally, a distance Gcc from a tread profile to a tire inner circumferential surface in a tire equatorial plane and a distance Gsh from a tread end to the tire inner circumferential surface have a relationship such that $1.10 \leq Gsh/Gcc$.

The pneumatic tire pertaining to the technology has the shoulder land portions having the second profile protruding inward in the tire radial direction within a ground contact surface. Also, the distance d of the first profile of the shoulder land portions within the ground contact surface increases toward an outer side in the tire width direction. As such, the ground contact pressure is increased on a ground contact edge side of the shoulder land portions when the tire contacts the ground. Thus, an amount of slippage of the land portions in the center region and an amount of slippage of the shoulder land portions are averaged when the tire contacts the ground. As a result, there is an advantage in that uneven wear of the shoulder land portions is reduced, and the uneven wear resistance performance of the tire is improved.

BRIEF DESCRIPTION OF THE DRAWINGS

FIGS. 9A-9B include a table showing results of performance testing of the pneumatic tire according to the embodiment of the technology.

FIGS. 10A-10B include a table showing results of performance testing of the pneumatic tire according to the embodiment of the technology.

DETAILED DESCRIPTION

The technology is described in detail below, with reference to the accompanying drawings. However, the technology is not limited to the embodiment. In addition, the components of the embodiment include components that are replaceable while maintaining consistency with the technology, and obviously replaceable components. Furthermore, a plurality of modified examples described in the embodiment may be freely combined within the scope of obviousness to a person skilled in the art.

Pneumatic Tire

Figure 1:
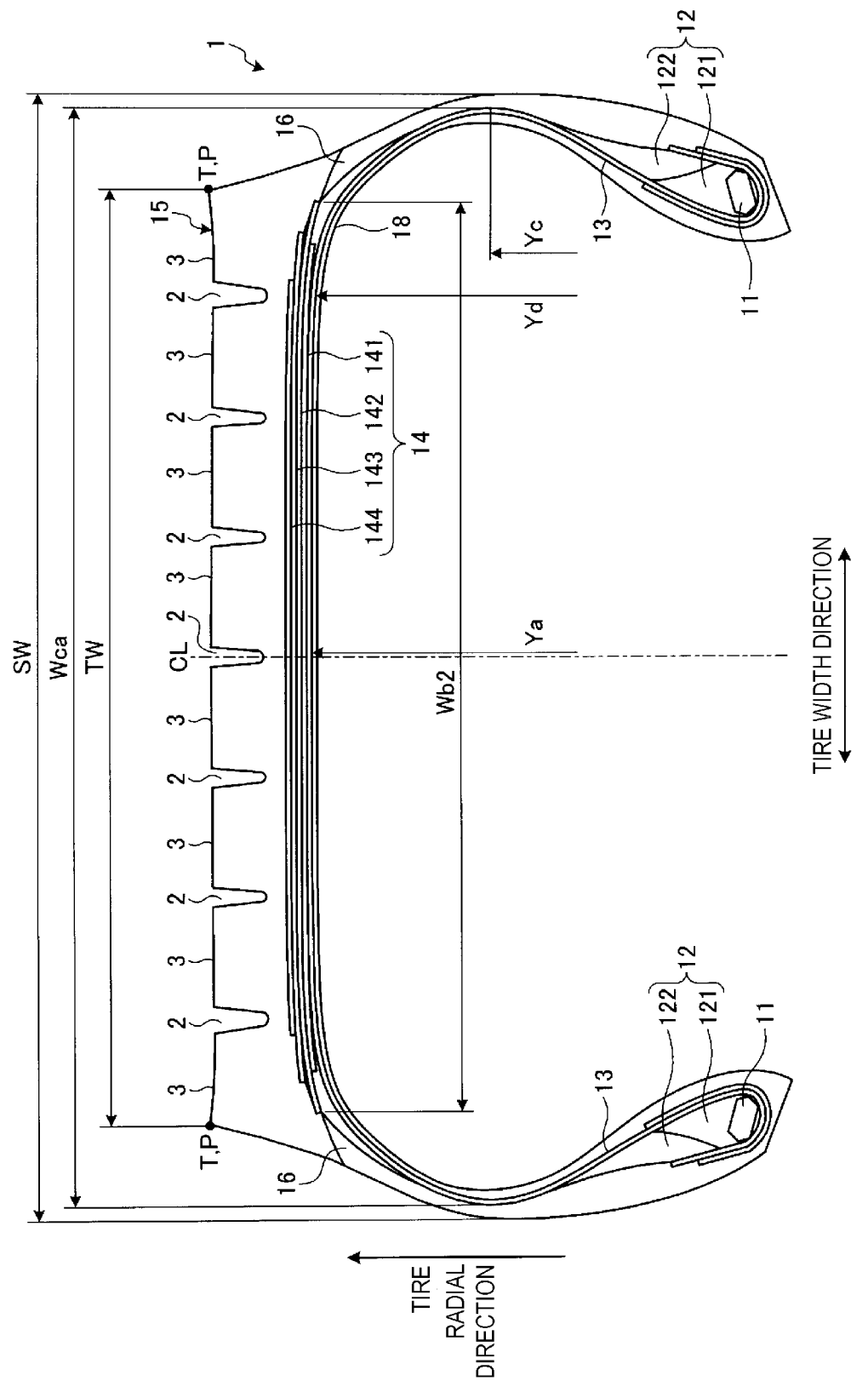
FIG. 1 is a cross-sectional view along a tire meridian direction illustrating a pneumatic tire according to an embodiment of the technology.

FIG. 1 is a cross-sectional view along a tire meridian direction illustrating a pneumatic tire pertaining to the embodiment of the technology. In FIG. 1, a radial tire for heavy loads mounted on a truck, bus, or the like for long-distance transport is illustrated as an example of a pneumatic tire 1. Here, the tire equatorial plane is indicated by the reference sign CL. In addition, in FIG. 1, a tread end P and a tire ground contact edge T are congruent.

The pneumatic tire 1 includes a pair of bead cores 11, 11, a pair of bead fillers 12, 12, a carcass layer 13, a belt layer 14, a tread rubber 15, and a pair of sidewall rubbers 16, 16 (see FIG. 1).

Each of the bead cores 11, 11 has an annular structure, and configures a respective core of bead portion on the left and right sides. Each of the bead fillers 12, 12 is formed from a lower filler 121 and an upper filler 122. The bead fillers 12, 12 are disposed on the outer circumference in the tire radial direction with respect to the pair of bead cores 11, 11, and serve to reinforce the respective bead portions.

The carcass layer 13 extends between the left and right side bead cores 11, 11 in a toroidal form, forming a framework for the tire. In addition, both edge portions of the carcass layer 13 are wound back from the inner side in the tire width direction to the outer side in the tire width direction and fixed so as to wrap around each respective bead core 11 and bead filler 12. Also, the carcass layer 13 is configured from a plurality of carcass cords, each formed from steel or an organic fiber material (e.g., nylon, polyester, rayon, or the like), covered by a coating rubber and subjected to a rolling process. The carcass layer 13 has a carcass angle (angle of inclination of a fiber direction of the carcass cords with respect to the tire circumferential direction), as an absolute value, of not less than 85° and not more than 95°.

The belt layer 14 is formed by laminating a plurality of belt plies 141 to 144, and is disposed by being wound around the outer circumference of the carcass layer 13. The specific configuration of the belt layer 14 is described below.

The tread rubber 15 is disposed on the outer circumference in the tire radial direction of the carcass layer 13 and the belt layer 14, and configures a tread portion. Each of the sidewall rubbers 16, 16 is disposed on the outer side in the tire width direction of the carcass layer 13. The sidewall rubbers 16, 16 constitute sidewall portions on the left and right sides.

Here, given the configuration of FIG. 1, the pneumatic tire 1 is provided with seven circumferential main grooves 2 extending in the tire circumferential direction, and with eight land portions 3 partitioned by the circumferential main grooves 2. In addition, the land portions 3 are each formed as a rib that is continuous in the tire circumferential direction, or alternatively, as a block divided in the tire circumferential direction by lug grooves (not illustrated in the drawings).

Here, any circumferential groove having a groove width of not less than 5.0 mm is referred to as a circumferential main groove. The groove width of the circumferential main grooves is measured excluding any notched portions or chamfered portions formed on a groove opening portion.

In addition, in this pneumatic tire 1, circumferential main grooves 2, 2 on the outermost side to the left and right sides in the tire width direction are referred to as outermost circumferential main grooves. Also, the land portions 3, 3, on the left and right sides of the outer side in the tire width direction partitioned by the outermost circumferential main grooves 2, 2 are referred to as shoulder land portions.

Belt Layer

Figure 2:
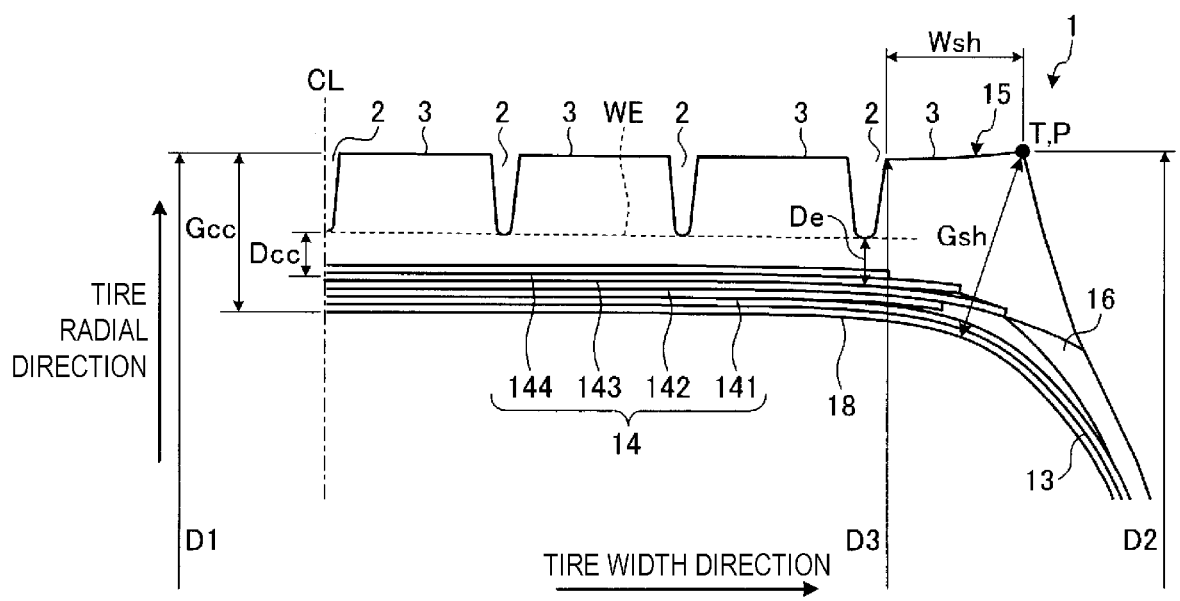
FIG. 2 is an explanatory view illustrating a belt layer of the pneumatic tire illustrated in FIG. 1.
Figure 3:
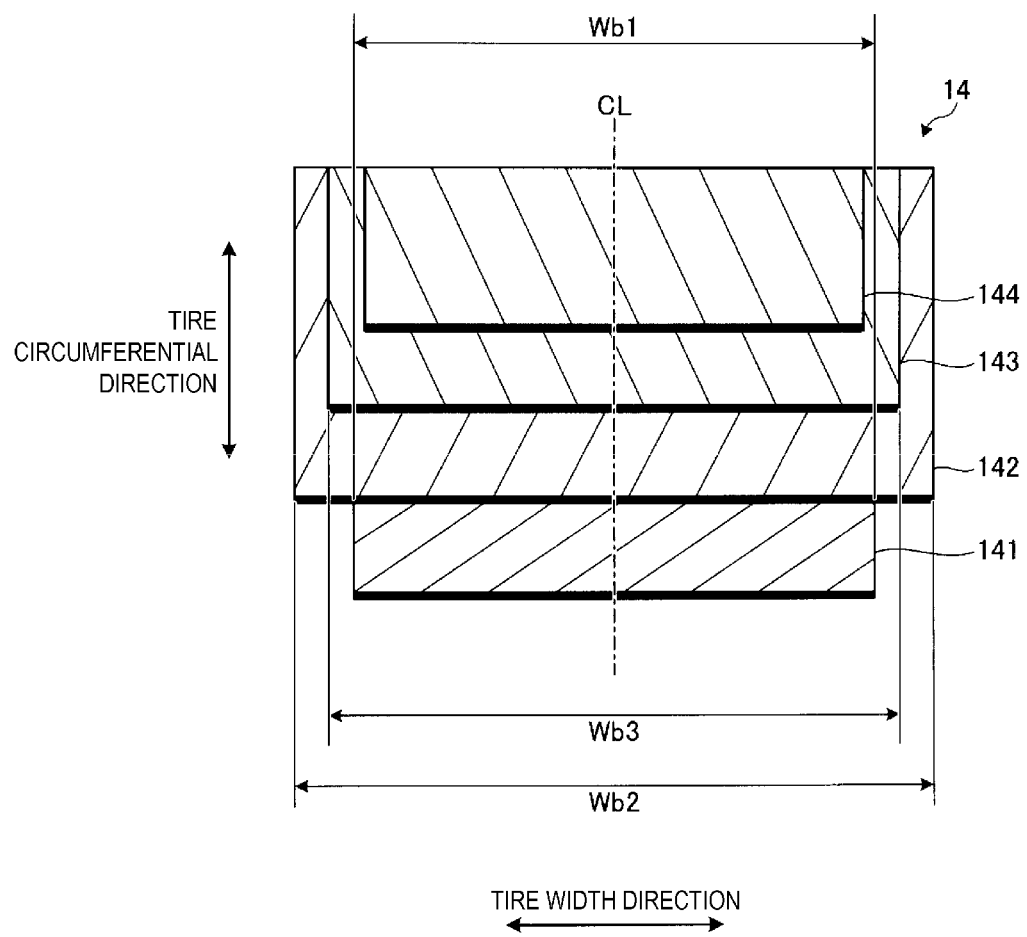
FIG. 3 is an explanatory view illustrating the belt layer of the pneumatic tire illustrated in FIG. 1.

FIG. 2 and FIG. 3 are explanatory views illustrating the belt layer of the pneumatic tire illustrated in FIG. 1. Among these drawings, FIG. 2 illustrates a region on one side of the tread portion demarcated by the tire equatorial plane CL. FIG. 3 illustrates a laminated structure of the belt layer 14. Here, FIG. 3 schematically illustrates belt cords in each of the belt plies 141 to 144 as thin lines drawn on each of the belt plies 141 to 144.

The belt layer 14 is formed by laminating a large-angle belt 141, a pair of cross belts 142, 143, and a belt cover 144. The belt layer 14 is disposed by being wound and mounted onto the outer circumference of the carcass layer 13 (see FIG. 2).

The large-angle belt 141 is configured from a plurality of belt cords formed from steel or an organic fiber material, covered by coating rubber, and subjected to a rolling process, having a belt angle (angle of inclination of the belt cords in the fiber direction with respect to the tire circumferential direction), as an absolute value, of not less than 45° and not more than 70°. In addition, the large-angle belt 141 is laminated and disposed laminated on the outer side in the tire radial direction of the carcass layer 13.

The pair of cross belts 142, 143 are configured by a plurality of belt cords formed from steel or an organic fiber material, covered by coating rubber, and subjected to a rolling process, having a belt angle, as an absolute value, of not less than 10° and not more than 45°. In addition, the pair of cross belts 142, 143 have respective belt angles of opposite signs, and are laminated so as to cross each other in the fiber direction of the belt cords (cross-ply structure).

Here, the cross belt 142 positioned on the inner side in the tire radial direction is referred to as an inner-side cross belt, and the cross belt 143 positioned on the outer side in the tire radial direction is referred to as an outer-side cross belt. Here, three or more of the cross belts may also be laminated and disposed (not illustrated in the drawings). In addition, in this embodiment, the pair of cross belts 142, 143 are laminated and disposed on the outer side in the tire radial direction of the large-angle belt 141.

In addition, the belt cover 144 is configured by a plurality of belt cords formed from steel or an organic fiber material, covered by coating rubber, and subjected to a rolling process, having a belt angle, as an absolute value, of not less than 10° and not more than 45°. Also, the belt cover 144 is laminated and disposed and on the outer side in the tire radial direction of the pair of cross belts 142, 143. Here, in this embodiment, the belt cover 144 has the same belt angle as the outer-side cross belt 143, and is arranged as the outermost layer of the belt layer 14.

Here, in the pneumatic tire 1, the belt layer 14 may also have an edge cover (not illustrated in the drawings). Typically, such an edge cover is configured from a plurality of belt cords formed from steel or an organic fiber material, covered by coating rubber and subjected to a rolling process, having a belt angle, as an absolute value, of not less than 0° and not more than 5°. In addition, the edge cover is arranged on outer side in the tire radial direction of the edge portions on the left and right sides of the outer-side cross belt 143 (alternatively, of the inner-side cross belt 142). The difference in radial growth between a center region and a shoulder region of the tread portion is reduced, so as to improve uneven wear resistance of the tire through a hoop effect demonstrated by the edge cover.

Improved Uneven Wear Resistance Performance

Conventionally, when a tire mainly used for high-speed continuous travel, such as line hauling, is used under free rolling usage conditions, there is a problem that uneven wear occurs in the land portions in the shoulder region of the tread portion.

As such, this pneumatic tire 1 employs the following configuration in order to suppress the uneven wear of the shoulder land portions (see FIG. 1 to FIG. 3).

As illustrated in FIG. 2, a wear end limit surface WE of the circumferential main grooves 2 is drawn in a cross-sectional view of the tire meridian direction. The wear end limit surface WE is a surface estimated from a wear indicator present in the tire, and is a curve drawn in parallel to the tread profile, passing through a wear limit indicator (wear indicator) of the outermost circumferential main groove 2. The wear end limit surface WE is measured with the tire in a non-inflated state, using a single tire. In a typical pneumatic tire, the wear end limit surface WE is a curve substantially parallel to the tread profile.

Here, a distance De from the outer-side cross belt 143 to the wear end limit surface WE on a central groove line of the outermost circumferential main groove 2 and a distance Dcc from the outer-side cross belt 143 to the wear end limit surface WE on the tire equatorial plane CL have a relationship such that $0.70 \leq De/Dcc \leq 1.30$. In addition, the ratio De/Dcc is preferably within a range such that $0.90 \leq De/Dcc \leq 1.10$, and more preferably such that $De/Dcc=1.00$.

The distance Dcc and the distance De are each measured with the tire in a non-inflated state, using a single tire. In addition, the measurement point on the outer-side cross belt 143 side is defined by a curve joining respective midpoints of the belt cords configuring the outer-side cross belt 143, in the cross-sectional view in the tire meridian direction.

Here, the term "specified rim" refers to an "applicable rim" as defined by the Japan Automobile Tyre Manufacturers Association (JATMA), to a "design rim" as defined by the Tire and Rim Association (TRA), or to a "measuring rim" defined by the European Tyre and Rim Technical Organization (ETRTO). In addition, the term "specified internal pressure" refers to "maximum air pressure" as stipulated by JATMA, to a maximum value in "Tire Load Limits at various Cold Inflation Pressures" as defined by TRA, and to "Inflation Pressures" as stipulated by ETRTO. Also, the term "specified load" refers to a "maximum load capacity" stipulated by JATMA, to a "maximum value" in "Tire Load Limits at various Cold Inflation Pressures" as defined by TRA, and to a "Load Capacity" as stipulated by ETRTO. However, according to JATMA, for a passenger vehicle tire, the specified internal pressure is an air pressure of 180 kPa, and a specified load is 88% of maximum load capacity.

In addition, the distance Gcc from the tread profile to the tire inner circumferential surface in the tire equatorial plane CL and the distance Gsh from the tread end P to the tire inner circumferential surface preferably have a relationship such that $1.10 \leq Gsh/Gcc$, and more preferably have a relationship such that $1.20 \leq Gsh/Gcc$.

Figure 6:
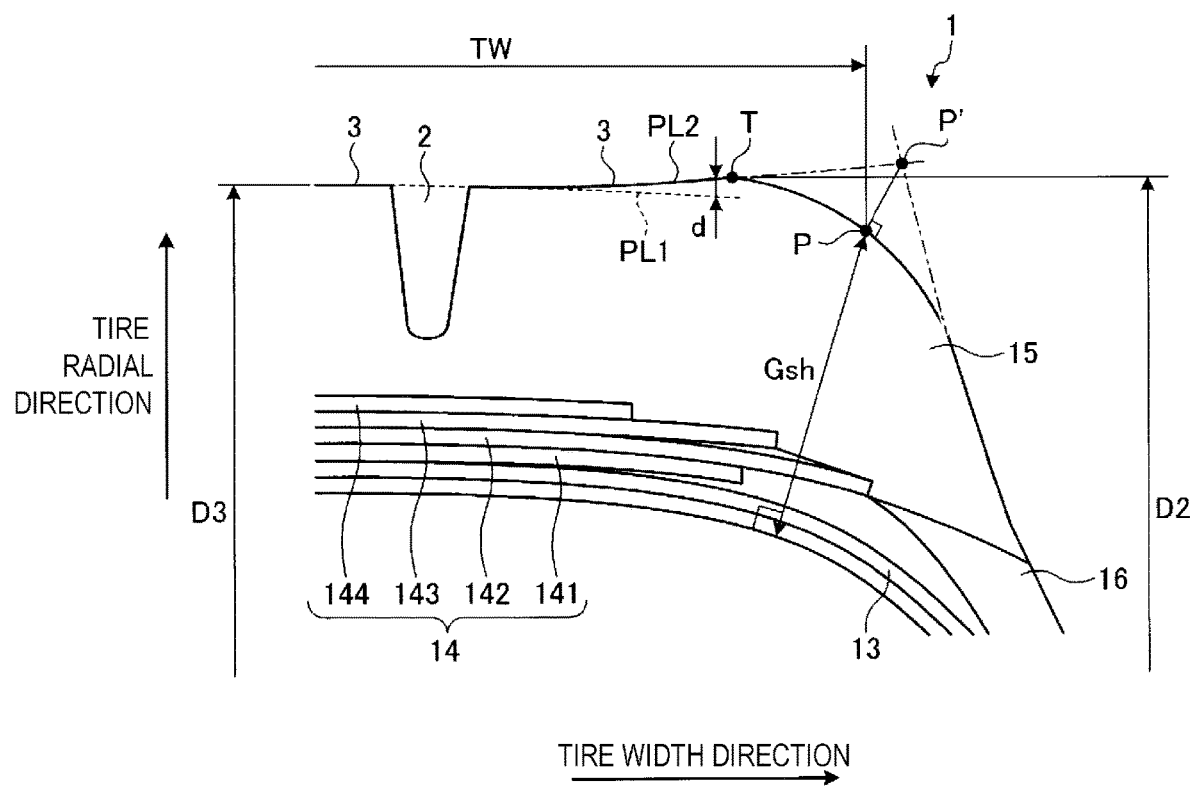
FIG. 6 is an explanatory view illustrating a modified example of the pneumatic tire illustrated in FIG. 1.

No particular limitation is intended to the upper limit of the ratio Gsh/Gcc. However, the upper limit of the ratio Gsh/Gcc is preferably defined such that, with the tire mounted on a specified rim and filled to a specified internal pressure in an unloaded state, the radius at the tread end P of the tread profile is equal to or less than the radius at the tire equatorial plane CL. That is, the upper limit of the ratio Gsh/Gcc is preferably defined such that the tread profile has an arc shape or a linear shape with a center on the inner side in the tire radial direction, and does not have an inverse-R shape (an arc shape with a center on the outer side in the tire radial direction). For example, in a configuration having shoulder sections in a square shape, as illustrated in FIG. 2, the upper limit of the ratio Gsh/Gcc is on the order of from 1.4 to 1.5. Conversely, in a configuration having shoulder sections in a round shape, as illustrated in FIG. 6, described later, the upper limit of the ratio Gsh/Gcc is on the order of from 1.3 to 1.4.

The distance Gcc is measured as the distance from the intersection of the tire equatorial plane CL and the tread profile to the intersection of the tire equatorial plane CL and the tire inner circumferential surface when viewed as a cross-section from the tire meridian direction. Accordingly, in the configuration of FIG. 1 and FIG. 2, in which one of the circumferential main grooves 2 is disposed in the tire equatorial plane CL, the distance Gcc is measured excluding this circumferential main groove 2. The distance Gsh is measured as the length of a perpendicular line drawn from the tread end P to the tire inner circumferential surface when viewed as a cross-section from the tire meridian direction.

Here, in the configuration of FIG. 2, the pneumatic tire 1 includes an inner liner 18 on the inner circumferential surface of the carcass layer 13. The inner liner 18 is disposed across the entirety of the tire inner circumferential surface. In such a configuration, the distance Gcc and the distance Gsh are measured using the surface of the inner liner 18 as a reference (tire inner circumferential surface).

The tread end P is (1) a point on the edge portion, given a configuration having the shoulder sections in a square shape. For example, in the configuration of FIG. 2, the tread end P and the tire ground contact edge T are congruent because the shoulder section has the square shape. Conversely, (2) in a configuration where the shoulder section has the round shape, such as the modified example of FIG. 6, described later, the profile of the tread portion and the profile of the sidewall portion have an intersection point P', and the tread end P is taken to be the foot of a perpendicular line drawn from the intersection point P' to the shoulder section when viewed as a cross-section from the tire meridian direction.

Here, the tire ground contact edge T is a maximum width position in the tire axial direction in a contact surface of the tire with a flat plate, with the tire being mounted on a specified rim, filled to a specified internal pressure, placed perpendicularly to the flat plate while in a static state, and loaded with a load corresponding to a specified internal load.

Figure 4:
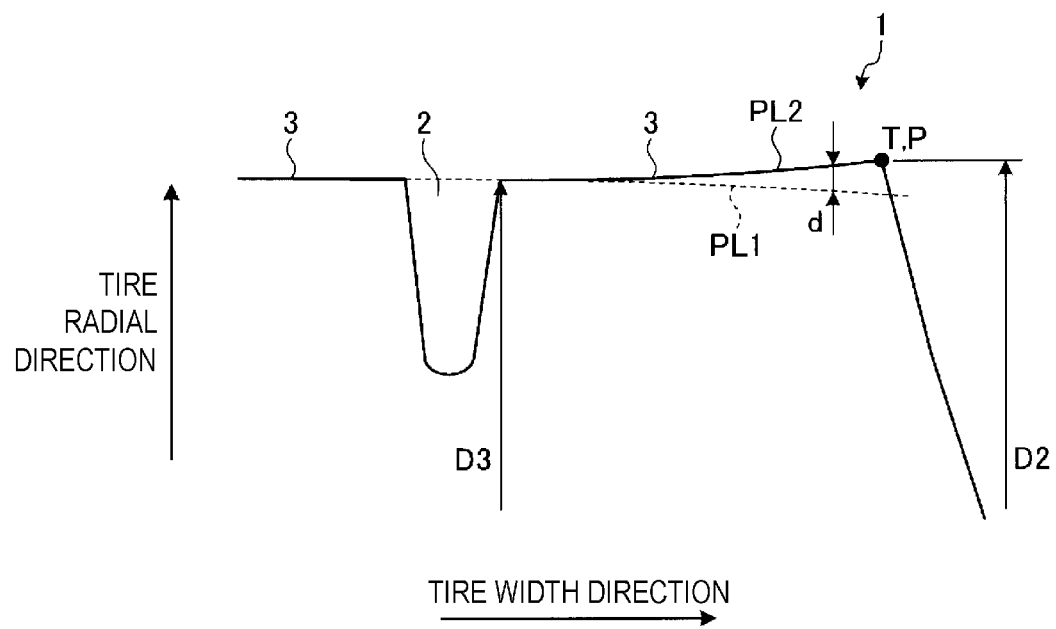
FIG. 4 is an enlarged view illustrating a shoulder land portion of the pneumatic tire illustrated in FIG. 1.

FIG. 4 is an enlarged view illustrating the shoulder land portion of the pneumatic tire illustrated in FIG. 1. FIG. 4 also illustrates the relationship between a line extending from a first profile PL1 of the land portion 3 in a center region, and a second profile PL2 of the shoulder land portion 3.

As illustrated in FIG. 4, in this pneumatic tire 1, a center land portion 3 and a second land portion 3, which are disposed inward of the outermost circumferential main grooves 2, 2, have the first profile PL1 and thus protrude outward in the tire radial direction when viewed as a cross-section from the tire meridian direction. In addition, the shoulder land portions 3, being further on the outer side in the tire width direction than the outermost circumferential main grooves 2, 2, has the second profile PL2 and thus protrudes toward the inner side in the tire radial direction within the ground contact surface.

Each of the first profile PL1 and the second profile PL2 is preferably a smooth curve formed from a single arc or from a plurality of arcs in combination. However, no such limitation is intended. The first profile PL1 and the second profile PL2 may also have a configuration that partially includes straight lines.

In addition, a distance d in the tire radial direction from a line extending from the first profile PL1 to the second profile PL2 within the ground contact surface of the shoulder land portion 3 increases toward the outer side in the tire width direction.

For example, in the configuration of FIG. 4, the first profile PL1 of the center land portion 3 and the second land portion 3 is formed from a single arc that protrudes outward in the tire radial direction, has a maximum diameter D1 in the tire equatorial plane CL (see FIG. 2), and reduces in diameter in the tire radial direction toward the outer side in the tire width direction. Conversely, the second profile PL2 of the shoulder land portion 3 is formed from a single arc that protrudes inward in the tire radial direction, has a minimum diameter D3 at an end portion on the inner side in the tire width direction of the shoulder land portion 3, and increases in diameter toward the outer side in the tire width direction. As a result, the shoulder land portion 3 has a ground contact surface shape that rises outward in the tire radial direction toward the outer side in the tire width direction. Therefore, the second profile PL2 of the shoulder land portion 3 is increasingly separated from the outer side in the tire radial direction toward the outer side in the tire width direction, with respect to the line extending from the first profile PL1 of the center land portion 3 and the second land portion 3. In addition, the distance d between the profiles PL1, PL2 increases monotonically from the edge portion on the inner side in the tire width direction of the shoulder land portion 3 toward the outer side in the tire width direction.

According to this configuration, the shoulder land portion 3 has the second profile PL2 that protrudes inward in the tire radial direction within the ground contact surface. Also, the distance d between the profiles PL1, PL2 within the ground contact surface of the shoulder land portion 3 increases toward the outer side in the tire width direction. As such, the ground contact pressure on the tire ground contact edge T side of the shoulder land portion 3 is increased when the tire contacts the ground. Thus, the amount of slippage of the land portions 3 in the center region and the amount of slippage of the shoulder land portions 3 are averaged when the tire contacts the ground. As a result, uneven wear is suppressed in the shoulder land portions 3.

Here, the profile shape and the profile diameter are measured with the tire being mounted on a specified rim, filled to a specified internal pressure, and in an unloaded state. Furthermore, the diameter of the profile is measured as a diameter of the profile centered on the tire rotational axis.

In addition, in the above-described configuration, the diameter D1 of the first profile PL1 in the tire equatorial plane CL and the diameter D2 of the second profile PL2 on the tire ground contact edge T preferably have a relationship such that −0.015≤(D1−D2)/D1≤0.015. That is, the diameter of the profile for the whole tire is preferably substantial equal at the tire equatorial plane CL and at the tire ground contact edge T.

Also, the diameter D2 of the second profile PL2 at the tire ground contact edge T and the diameter D3 of the second profile PL2 at the edge portions on the inner side in the tire width direction of the shoulder land portions 3 preferably have a relationship such that D3<D2. In addition, the diameters D2, D3 preferably have a relationship such that 0.0<D2−D3<15.0, with values in millimeters. Thus, as illustrated in FIG. 4, the shoulder land portions 3 preferably has a ground contact surface shape that gradually rises outward in the tire radial direction toward the outer side in the tire width direction.

However, no such limitation is intended, provided that the diameter D2 of the second profile PL2 at the tire ground contact edge T and the diameter D3 of the second profile PL2 at the edge portion on the inner side in the tire width direction of the shoulder land portion 3 have a relationship such that D2≤D3. Accordingly, the shoulder land portion 3 may also have a flat ground contact surface shape, and may have a ground contact surface shape that drops toward the outer side in the tire width direction.

Figure 5A:
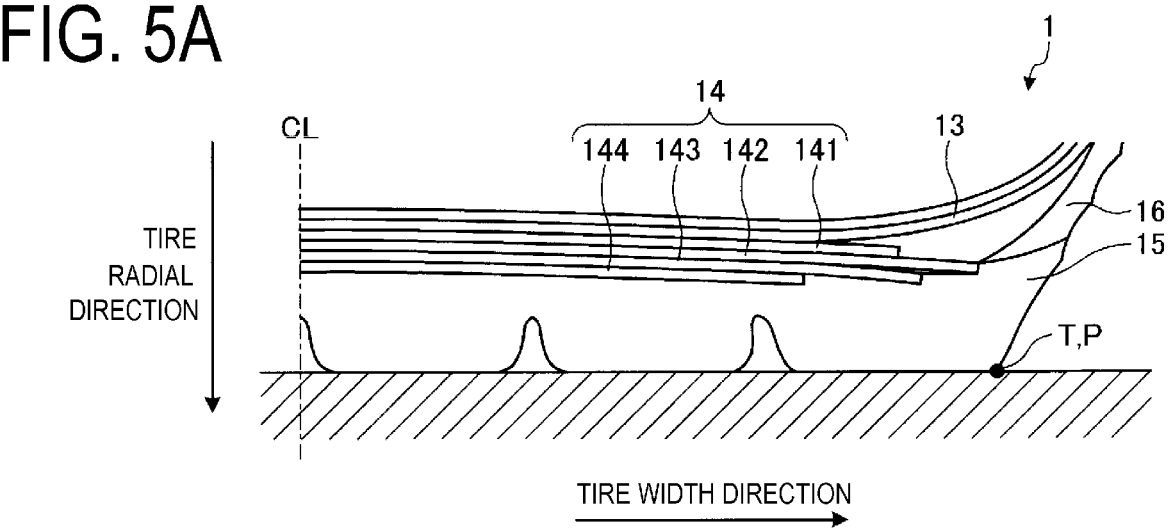
FIGS. 5A and 5B are explanatory views illustrating the action of the pneumatic tire illustrated in FIG. 1.
Figure 5B:
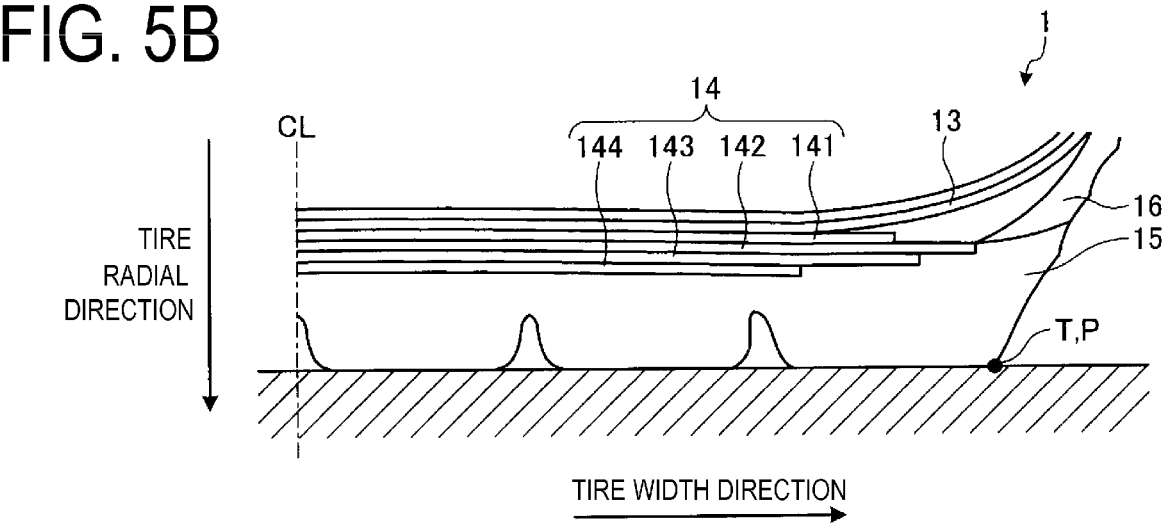

FIGS. 5A and 5B are explanatory views illustrating the action of the pneumatic tire illustrated in FIG. 1. FIGS. 5A and 5B each illustrate a ground contact state of the tire having different values for the ratio De/Dcc and the ratio Gsh/Gcc.

In the tire of the comparative example of FIG. 5A, with respect to the configuration of FIG. 1 to FIG. 3, the ratio De/Dcc is set equivalently (De/Dcc=1.00) and the ratio Gsh/Gcc is set smaller (Gsh/Gcc=1.06). According to such a configuration, when the tire does not contact the ground, the tread profile has a shape that drops, with a reducing outer diameter, from the tire equatorial plane CL toward the tread end P (not illustrated in the drawings). As a result, as illustrated in FIG. 5A, the shoulder region of the tread portion is greatly deformed on the road surface side (outer side in the tire radial direction) when the tire contacts the ground. Here, the distances Dcc, De from the outer-side cross belt 143 to the wear end limit surface WE are uniform (De/Dcc=1.00). As such, the end portion of the outer-side cross belt 143 is greatly bent toward the road surface side (outer side in the tire radial direction) following the deformation of the shoulder region in the tread portion. As a result, the outer-side cross belt 143 is under great strain when the tire contacts the ground.

In contrast, in the tire of the working example of FIG. 5B, with respect to the configuration of FIG. 1 to FIG. 3, the ratio De/Dcc is set equivalently (De/Dcc=1.00), and the ratio Gsh/Gcc is set larger (Gsh/Gcc=1.20). According to such a configuration, when the tire does not contact the ground, the difference in diameter between the outer diameter of the tread profile at the tire equatorial plane CL and the outer diameter at the tread end P is small, and the tread profile has a shape that is flat overall (substantially parallel to the tire rotational axis) (see FIG. 1 and FIG. 2). As a result, as illustrated in FIG. 5B, the shoulder region in the tread portion undergoes little deformation when the tire contacts the ground. In addition, the inflation state of the tire typically causes a drop in the tread profile due to the internal pressure, which produces a difference in diameter between the shoulder region in the tread portion and the shoulder regions. As such, setting the ratio Gsh/Gcc larger (Gsh/Gcc=1.20) leads to the shoulder region in the tread portion having an inverse-R shape (rising outward in the tire radial direction) before inflation. Thus, the dropping of the tread profile in the inflated state is constrained, and the outer-side cross belt 143 has an overall flat shape. As a result, strain on the outer-side cross belt 143 when the tire contacts the ground is decreased.

As described above, in comparison to the configuration of FIG. 5A, the configuration of FIG. 5B has a small amount of deformation in the shoulder region in the tread portion when the tire contacts the ground, and the outer-side cross belt 143 is under a small amount of strain. As a result, the amount of slippage of the land portion 3 in the center region and the amount of slippage of the shoulder land portion 3 are averaged when the tire contacts the ground, which serves to suppress uneven wear of the shoulder land portion 3.

Furthermore, in the configuration of FIG. 5B, because of the presence of the configuration of FIG. 4, the shoulder land portion 3 has the second profile PL2 that protrudes inward in the tire radial direction within the ground contact surface. Also, the distance d between the profiles PL1, PL2 within the ground contact surface of the shoulder land portion 3 increases toward the outer side in the tire width direction. According to this configuration, the ground contact pressure of the shoulder land portion 3 on the tire ground contact edge T side increases when the tire contacts the ground. Also, the amount of slippage of the land portions 3 in the center region and the amount of slippage of the shoulder land portions 3 is averaged when the tire contacts the ground. As a result, uneven wear is effectively suppressed in the shoulder land portion 3.

Rounded Shoulder Sections

FIG. 6 is an explanatory view illustrating a modified example of the pneumatic tire illustrated in FIG. 1. FIG. 6 illustrates a configuration in which the shoulder sections have a rounded shape.

In the configuration of FIG. 1, the shoulder section has a square shape, in which the tire ground contact edge T and tread edge P are congruent, as illustrated in FIG. 2.

However, no such limitation is intended. As illustrated in FIG. 6, the shoulder section may also have a rounded shape. In such a situation, as described above, the profile of the tread portion and the profile of the sidewall portion have an intersection point P', and the tread end P is taken to be the foot of a perpendicular line drawn from the intersection point P' to the shoulder section when viewed as a cross-section from the tire meridian direction. Therefore, the tire ground contact edge T and the tread end P are typically at different positions with respect to each other.

Additional Data

Furthermore, as illustrated in FIG. 1, the tread width TW and a total tire width SW preferably have a relationship such that $0.79 \leq TW/SW \leq 0.89$.

The total tire width SW refers to a linear distance (including all portions such as letters and patterns on the tire side surface) between the sidewalls with the tire being mounted on a specified rim, inflated to the specified internal pressure, and in an unloaded state.

In addition, in FIG. 1 and FIG. 2, the ground contact width Wsh of each shoulder land portion 3 and the tread width TW preferably have a relationship such that $0.1 \leq Wsh/TW \leq 0.2$. This relationship being satisfied provides an appropriate ground contact width Wsh for the shoulder land portions 3.

The ground contact width is measured as a maximum linear distance in the tire axial direction of a contact surface between the tire and a flat plate, in a configuration where the tire is mounted on a specified rim and inflated to a specified internal pressure, arranged perpendicularly to the flat plate while being in a static state, and has a load applied that corresponds to a specified load.

Furthermore, in FIG. 1, a width Wb2 of a wider cross belt 142 and the cross-sectional width Wca of the carcass layer 13 preferably have a relationship such that $0.70 \leq Wb2/Wca \leq 0.93$, and more preferably have a relationship within a range such that $0.78 \leq Wb2/Wca \leq 0.83$.

Furthermore, the tread width TW and the cross-sectional width Wca of the carcass layer 13 preferably have a relationship such that $0.82 \leq TW/Wca \leq 0.92$.

The tread width TW is a distance in the direction of the tire rotational axis between the left and right tread ends P, P, measured with the tire being mounted on a specified rim, inflated to a specified internal pressure, and in an unloaded state.

The cross-sectional width Wca of the carcass layer 13 is a linear distance between the left and right maximum width positions of the carcass layer 13 with the tire being mounted on a specified rim, inflated to the specified internal pressure, and in an unloaded state.

In addition, in this pneumatic tire 1, a width Wb1 of the large-angle belt 141 and a width Wb3 of the wider cross belt 143 among the pair of cross belts 142, 143 preferably have a relationship such that $0.85 \leq Wb1/Wb3 \leq 1.05$ (see FIG. 3). As a result, the ratio Wb1/Wb3 is made appropriate.

The width Wb1 of the large-angle belt 141 and the width Wb3 of the cross belt 143 are measured as respective distances in the tire width direction, with the tire being mounted on a specified rim, filled to a specified internal pressure, and in an unloaded state.

Here, in the configuration of FIG. 1, as illustrated in FIG. 3, the belt layer 14 has a configuration having lateral symmetry about the center of the tire equatorial plane CL, as illustrated in FIG. 3. Also, the width Wb1 of the large-angle belt 141 and the width Wb3 of the wider cross belt 143 have a relationship such that Wb1<Wb3. As a result, in one side region of the tire equatorial plane CL, the edge portion of the large-angle belt 141 is arranged on the inner side in the tire width direction relative to the edge portion of the wider cross belt 143. However, no such limitation is intended. The width Wb1 of the large-angle belt 141 and the width Wb3 of the wider cross belt 143 may also have a relationship such that Wb1≥Wb3 (not illustrated in the drawings).

In addition, in FIG. 1, a diameter Ya at the maximum height position of the carcass layer 13, a diameter Yc at the maximum width position of the carcass layer 13, and a diameter Yd of the carcass layer 13 along a central groove line of the outermost circumferential main groove 2 preferably have relationships such that $0.80 \leq Yc/Ya \leq 0.90$ and $0.95 \leq Yd/Ya \leq 1.02$. As a result, the shape of the carcass layer 13 is made appropriate.

The diameter Ya at the maximum height position of the carcass layer 13 is measured as a distance from the tire rotational axis to the intersection point of the tire equatorial plane CL and the carcass layer 13 with the tire being mounted on the specified rim, inflated to the specified internal pressure, and in an unloaded state.

The diameter Yc at the maximum width position of the carcass layer 13 is measured as a distance from the tire rotational axis to the maximum width position of the carcass layer 13 with the tire being mounted on the specified rim, inflated to the specified internal pressure, and in an unloaded state.

A diameter Yd of the carcass layer 13 along the central groove line of the outermost circumferential main groove is measured, when taking a point Q3 (not illustrated in the drawings) at the intersection of the central groove line of the outermost circumferential main groove and the carcass layer 13, as a distance from the tire rotational axis to the point Q3 with the tire being mounted on a specified rim, filled to a specified internal pressure, and in an unloaded state.

In addition, in FIG. 1, the actual tire ground contact width Wg (not illustrated in the drawings) and the cross-sectional width Wca of the carcass layer 13 preferably have a relationship such that $0.64 \leq Wg/Wca \leq 0.84$. As a result, the ratio Wg/Wca of the actual tire ground contact width Wg and the cross-sectional width Wca of the carcass layer 13 is made appropriate.

The actual tire ground contact width Wg is calculated as the difference between the ground contact width of the tire as a whole, and the total groove width of all of the circumferential main grooves 2.

In addition, the belt cords of the large-angle belt 141 are preferably steel wire, and the number of ends in the large-angle belt 141 is preferably not less than 15 ends/50 mm and not more than 25 ends/50 mm. In addition, the belt cords of the pair of cross belts 142, 143 are preferably steel wire. The number of ends in each of the pair of cross belts 142, 143 is preferably not less than 18 ends/50 mm and not more than 28 ends/50 mm, and the number of ends is more preferably not less than 20 ends/50 mm and not more than 25 ends/50 mm. As a result, the strength of the belt plies 141, 142, 143 may be appropriately secured.

Furthermore, a breaking elongation $\lambda 1$ of the coating rubber of the large-angle belt 141 is preferably in a range such that $\lambda 1 \geq 200\%$. In addition, respective breaking elongations $\lambda 2$, $\lambda 3$ of the coating rubber of the pair of cross belts 142, 143 are preferably within a range such that $\lambda 2 \geq 200\%$ and $\lambda 3 \geq 200\%$. As a result, appropriate durability is secured for the belt plies 141, 142, 143.

Breaking elongation is measured by performing a tensile test conforming to JIS-K7161 on a test sample in the 1B shape of the JIS-K7162 specification (a dumbbell shape with a thickness of 3 mm) using a tensile tester (INSTRON 5585H manufactured by Instron Corp.) at a pulling speed of 2 mm/min.

Additionally, in the pneumatic tire 1, the breaking elongation of the tread rubber 15 is preferably within a range not less than 350%. As a result, the strength of the tread rubber 15 is secured, and the occurrence of tears on the outermost circumferential main groove 2 is suppressed. Here, no particular limitation is set on the upper limit of the breaking elongation of the tread rubber 15. However, some restrictions are imposed by the type of rubber compound used in the tread rubber 15.

Additionally, in this pneumatic tire 1, the hardness of the tread rubber 15 is preferably in a range of not less than 60. As a result, appropriate strength is secured for the tread rubber 15. No particular limitation is set on the upper limit of the hardness of the tread rubber 15. However, some restrictions are imposed by the type of rubber compound used in the tread rubber 15.

Here, the term rubber hardness refers to JIS-A hardness in accordance with JIS-K6263.

Furthermore, in the pneumatic tire 1, a loss tangent tan δ of the tread rubber 15 is preferably within a range such that 0.10≤tan δ.

The loss tangent tan δ is measured using a viscoelastic spectrometer, under conditions of a temperature of 20° C., a shearing strain of 10%, and a frequency of 20 Hz.

Shoulder Land Portion Chamfered Portions

Figure 7:
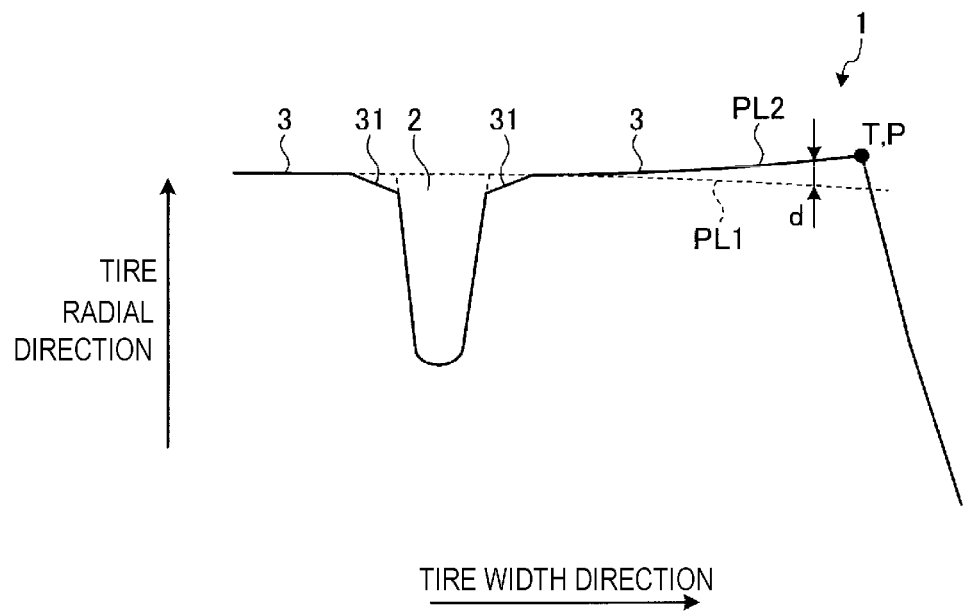
FIG. 7 is an explanatory view illustrating a modified example of the pneumatic tire illustrated in FIG. 1.

FIG. 7 is an explanatory view illustrating a modified example of the pneumatic tire illustrated in FIG. 1. FIG. 7 illustrates a magnified cross-sectional view of the shoulder land portion.

As illustrated in FIG. 7, in this pneumatic tire 1, the shoulder land portion 3 on the outermost side in the tire width direction preferably has a chamfered portion 31 on an edge portion on the circumferential main groove 2 side. The chamfered portion 31 may be a corner chamfer or a round chamfer, being formed continuously in the tire circumferential direction along the circumferential main groove 2, and may also be a notch formed non-continuously in the tire circumferential direction.

For example, in the configuration of FIG. 7, the land portions 3, 3 on the left and right sides partitioned by the outermost circumferential main groove 2 are ribs each having the chamfered portion 31 on an edge portion on the outermost circumferential main groove 2 side. In addition, the chamfered portion 31 is a corner chamfer formed continuously in the tire circumferential direction.

According to this configuration, the ground contact pressure is reduced at the edge portion on the circumferential main groove 2 side of the shoulder land portion 3 through the presence of the chamfered portion 31 at the edge portion on the circumferential main groove 2 side of the shoulder land portion 3. As a result, the uneven wear resistance performance of the tire is enhanced.

Buttress Portion Narrow Groove

Figure 8:
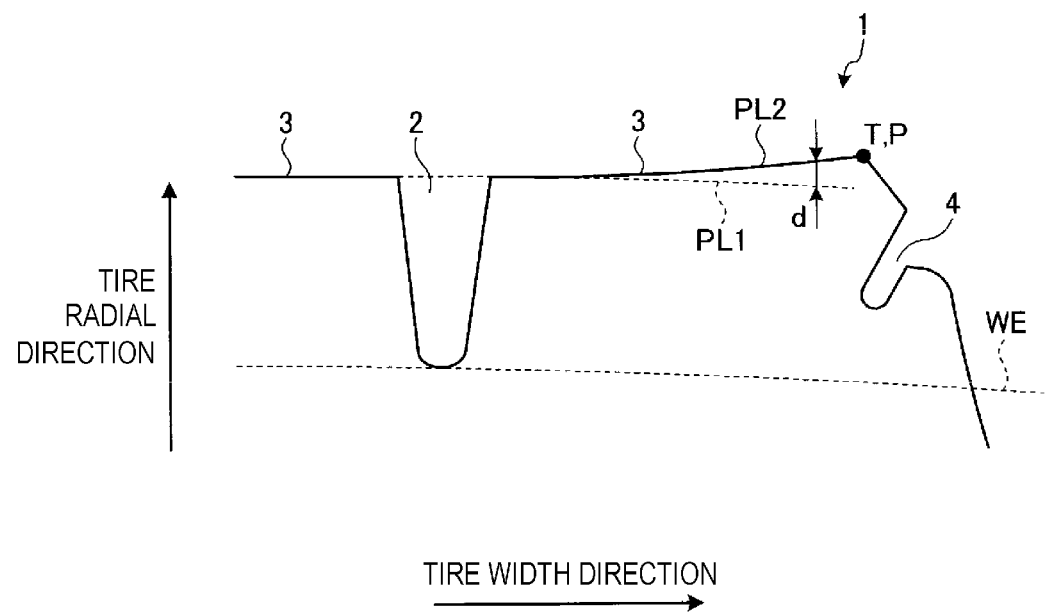
FIG. 8 is an explanatory view illustrating a modified example of the pneumatic tire illustrated in FIG. 1.

FIG. 8 is an explanatory view illustrating a modified example of the pneumatic tire illustrated in FIG. 1. FIG. 8 illustrates a magnified cross-sectional view of a buttress portion.

According to the configuration of FIG. 8, the pneumatic tire 1 is provided with a narrow groove 4. This narrow groove 4 is disposed in the buttress portion and extends in the tire circumferential direction. In addition, when viewed as a cross-section from the tire meridian direction, the narrow groove 4 is on the outer side in the tire radial direction relative to the wear end limit surface WE of the main circumferential direction groove 2.

The buttress portion is a non-ground contact region of a connecting portion between the profile of the tread portion and the profile of the sidewall portion, and configures a side wall surface on the outer side of the shoulder land portion 3 in the tire width direction.

For example, according to the configuration of FIG. 8, one narrow groove 4 is arranged in a non-ground contact region from the tread end P (tire ground contact edge T), which is the buttress portion, to the wear end limit surface WE of the circumferential main groove 2. In addition, the narrow groove 4 has a shape that is inclined with respect to the tire radial direction toward the tire interior.

According to this configuration, when the tire contacts the ground, the narrow groove 4 in the buttress portion is plugged and then the ground contact pressure on the shoulder land portion 3 is reduced. As a result, the uneven wear resistance performance of the tire is enhanced.

Effects

As described above, the pneumatic tire 1 includes a carcass layer 13, a belt layer 14 disposed on the outer side in the tire radial direction of the carcass layer 13, a tread rubber 15 disposed on the outer side in the tire radial direction of the belt layer 14, at least three circumferential main grooves 2 extending in the tire circumferential direction, and a plurality of land portions 3 partitioned by the circumferential main grooves 2 (see FIG. 1). In addition, the land portions 3 on the inner side in the tire width direction relative to the outermost circumferential main groove 2 on the left and right sides each have a first profile PL1 that protrudes outward in the tire radial direction. In addition, the shoulder land portions 3 each have a second profile PL2 that protrudes inward in the tire radial direction within the ground contact surface (see FIG. 4). In addition, the distance d in the tire radial direction from a line extending from the first profile PL1 to the second profile PL2 within the ground contact surface of the shoulder land portions 3 increases toward the outer side in the tire width direction. Also, the distance Gcc from the tread profile (first profile PL1) to the tire inner circumferential surface in the tire equatorial plane CL and the distance Gsh from the tread end P to the tire inner circumferential surface have a relationship such that 1.10≤Gsh/Gcc (see FIG. 2).

According to this configuration, the shoulder land portion 3 has the second profile PL2 that protrudes inward in the tire radial direction within the ground contact surface. Also, the distance d between the first and second profiles PL1, PL2 within the ground contact surface of the shoulder land portion 3 increases toward the outer side in the tire width direction. As such, the ground contact pressure on the tire ground contact edge T side of the shoulder land portion 3 is increased when the tire contacts the ground. Thus, the amount of slippage of the land portions 3 in the center region and the amount of slippage of the shoulder land portions 3 are averaged when the tire contacts the ground. As a result, there is an advantage in that uneven wear of the shoulder land portions 3 is reduced, and the uneven wear resistance performance of the tire is improved.

In addition, in this pneumatic tire 1, the distance Dcc from the outer-side cross belt 143 to the wear end limit surface WE in the tire equatorial plane CL and the distance De from the outer-side cross belt 143 to the wear end limit surface WE on the central groove line of the outermost circumferential main groove 2 have a relationship such that 0.70≤De/Dcc≤1.30 (see FIG. 2). According to this configuration, the ratio De/Dcc is made appropriate. This has a merit in that the amount of slippage of the land portion 3 in the center region and the amount of slippage of the shoulder land portion 3 are averaged when the tire contacts the ground, which constrains the uneven wear of the shoulder land portions 3.

In addition, in the pneumatic tire 1, the belt layer 14 has a belt angle of not less than 10° and not more than 45°, as an absolute value, and is provided with the pair of cross belts 142, 143 having belt angles of opposite signs (see FIG. 2). Also, the distance Dcc from the outer-side cross belt 143 to the wear end limit surface WE in the tire equatorial plane CL and the distance De from the outer-side cross belt 143 to the wear end limit surface WE on the central groove line of the outermost circumferential main groove 2 have a relationship such that 0.70≤De/Dcc≤1.30. This configuration has the merit that the distances Dcc, De of the outer-side cross belt 143 relative to the wear end limit surface WE are made appropriate. That is, given that 0.70≤De/Dcc, the tread gage is secured on the groove bottom of the outermost circumferential main groove 2 and groove cracking resistance performance is secured. In addition, given that De/Dcc≤1.30 (preferably, 0.80≤De/Dcc≤1.20), strain on the outer-side cross belt 143 is decreased when the tire contacts the ground (see FIGS. 5A, 5B for comparison). As a result, the amount of slippage of the land portion 3 in the center region and the amount of slippage of the shoulder land portion 3 are averaged when the tire contacts the ground, which serves to suppress uneven wear of the shoulder land portion 3.

In addition, in the pneumatic tire 1, the diameter D1 of the first profile PL1 in the tire equatorial plane CL and the diameter D2 of the second profile PL2 on the tire ground contact edge T have a relationship such that −0.015≤ (D1≤D2)/D1≤0.015 (see FIG. 4). As a result, the amount of dropping of the tire ground contact edge T is made appropriate. This has the merit that the amount of slippage of the land portion 3 in the center region and the amount of slippage of the shoulder land portion 3 are averaged when the tire contacts the ground.

In addition, in the pneumatic tire 1, the diameter D2 of the second profile PL2 at the tire ground contact edge T and the diameter D3 of the second profile PL2 at the edge portions on the inner side in the tire width direction of the shoulder land portions 3 have a relationship such that D3<D2 (see FIG. 4). As a result, this relationship has the merit that the profile shape of the shoulder land portions 3 is made appropriate.

In addition, in this pneumatic tire 1, the width Wb2 of the wider cross belt 142 and the cross-sectional width Wca of the carcass layer 13 have a relationship such that 0.70≤Wb2/Wca≤0.93 (see FIG. 1). As a result, the width Wb2 of the wider cross belt 142 is made appropriate, which has the merit that the stiffness of the tread portion is secured.

In addition, in the pneumatic tire 1, the diameter Ya of the carcass layer 13 at the maximum height position and the diameter Yc of the carcass layer 13 at the maximum width position have a relationship such that 0.80≤Yc/Ya≤0.90 (see FIG. 1). As a result, this relationship has a merit in that the shape of the carcass layer 13 is made appropriate.

In addition, in the pneumatic tire 1, the diameter Ya of the carcass layer 13 at the maximum height position and the diameter Yd of the carcass layer 13 at the central groove line of the outermost circumferential main groove 2 have a relationship such that 0.95≤Yd/Ya≤1.02 (see FIG. 1). As a result, the shape of the carcass layer 13 is made appropriate. This has a merit in that the amount of deformation of the carcass layer 13 is decreased at the groove bottom of the outermost circumferential main groove 2 when the tire contacts the ground. That is, given that 0.95≤Yd/Ya, the amount of deformation of the carcass layer 13 is decreased at the groove bottom of the outermost circumferential main groove 2 when the tire contacts the ground. In addition, given that Yd/Ya≤1.02, the tire shape is appropriately secured.

In addition, in the pneumatic tire 1, the tread width TW and the total tire width SW have a relationship such that 0.79≤TW/SW≤0.89 (see FIG. 1). According to this configuration, given that the ratio TW/SW is within the above-described range, the difference in radial growth between the center region and the shoulder region is alleviated. As a result, this configuration has a merit in that the ground contact pressure distribution of the tire is averaged. That is, given that 0.79≤TW/SW, the air volume within the tire is secured, and bending is suppressed. In addition, given that TW/SW≤0.89, rising of the shoulder section is suppressed and bending is constrained when the tire contacts the ground.

In addition, in the pneumatic tire 1, the tread width TW and the cross-sectional width Wca of the carcass layer 13 have a relationship such that 0.82≤TW/Wca≤0.92 (see FIG. 1). According to this configuration, given that the ratio TW/Wca is within the above-described range, the difference in radial growth between the center region and the shoulder region is alleviated, and the ground contact pressure distribution is averaged in the tire width direction. As a result, this configuration has a merit in that the ground contact pressure distribution of the tire is averaged. That is, given that 0.82≤TW/Wca, the air volume within the tire is secured and bending is suppressed. In addition, given that TW/Wca≤0.92, rising of the shoulder section is suppressed and the ground contact pressure distribution is averaged.

Also, in the pneumatic tire 1, the belt layer 14 has the large-angle belt 141 having, as an absolute value, a belt angle of not less than 45° and not more than 70° (see FIG. 1 and FIG. 3). As a result, the belt layer 14 is reinforced, which has a merit in that strain on the end portions of the belt layer 14 is reduced when the tire contacts the ground.

In addition, in the pneumatic tire 1, the width Wb1 of the large-angle belt 141 and the width Wb3 of a narrower cross belt 143 among the pair of cross belts 142, 143 have a relationship such that 0.85≤Wb1/Wb3≤1.05 (see FIG. 3). According to this configuration, the ratio Wb1/Wb3 between the width Wb1 of the large-angle belt 141 and the width Wb3 of the narrower cross belt 143 is made appropriate. As a result, there is a merit in that strain on the end portions of the belt layer 14 is constrained when the tire contacts the ground.

In addition, in the pneumatic tire 1, the ground contact width Wsh of the shoulder land portions 3 and the tread width TW have a relationships such that 0.1≤Wsh/TW≤0.2 (see FIG. 1 and FIG. 2). According to this configuration, there is a merit in that the ground contact width Wsh of the shoulder land portion 3 is made appropriate. That is, given that 0.1≤Wsh/TW, the ground contact surface area of the shoulder land portions 3 is secured and uneven wear resistance performance is secured for the tire. In addition, given that Wsh/TW≤0.2, the ground contact surface pressure of the shoulder land portions 3 is increased when the tire contacts the ground, and the wet performance of the tire is enhanced.

In addition, in the pneumatic tire 1, the actual tire ground contact width Wg (not illustrated in the drawings) and the cross-sectional width Wca of the carcass layer 13 have a relationship such that 0.64≤Wg/Wca≤0.84 (see FIG. 1). As a result, this relationship has a merit in that the cross-sectional width Wca of the carcass layer 13 is made appropriate. That is, given that 0.64≤Wg/Wca, the ground contact surface area of the tire is appropriately secured. In addition, given that Wg/Wca≤0.84, the tread width TW is configured so as to not be excessive and the ground contact surface pressure of the shoulder land portions 3 is appropriately secured.

In addition, in the pneumatic tire 1, the rubber hardness of the tread rubber 15 is in a range of not less than 60. As a result, there is a merit in that the strength of the tread rubber 15 is appropriately secured, and the uneven wear resistance performance of the tire is improved.

In addition, in the pneumatic tire 1, the shoulder land portion 3 has a chamfered portion 31 on an edge portion of the circumferential main groove 2 side (see FIG. 7). As a result, the ground contact pressure is decreased at the edge portion on the circumferential main groove 2 side of the shoulder land portion 3. This decrease of the ground contact pressure has a merit in that the uneven wear resistance performance of the tire is enhanced.

In addition, the pneumatic tire 1 is provided with a narrow groove 4 disposed in the buttress portion and extending in the tire circumferential direction (see FIG. 8). In addition, when viewed as a cross-section from the tire meridian direction, the narrow groove 4 is on the outer side in the tire radial direction relative to the wear end limit surface WE of the circumferential main groove 2. According to this configuration, when the tire contacts the ground, the narrow groove 4 in the buttress portion is plugged and then the ground contact pressure on the shoulder land portion 3 is reduced. As a result, there is a merit in that the uneven wear resistance performance of the tire is enhanced.

Target of Application

In addition, the pneumatic tire 1 is preferably applied to a heavy duty tire, having an aspect ratio of not less than 40% and not more than 70%, the tire being assembled on a regular rim, inflated to a regular internal pressure, and in a state of having a regular load applied. In a tire having the above-described low aspect ratio, the amount of dropping while inflated (difference in diameter between the center region and the shoulder region on the tread surface) is prone to increasing, and the ground contact shape is prone to become hourglass shaped when the tire contacts the ground. As such, having the low-profile heavy-duty tire as the target of application produces a remarkable effect of enhancement to the uneven wear resistance performance of the tire as described above.

Example

FIGS. 9A-9B and FIGS. 10A-10B are tables showing the results of performance testing of the pneumatic tires pertaining to the embodiments of the present technology.

In the performance testing, evaluation pertaining to uneven wear resistance performance was performed on a plurality of pneumatic tires that differed from each other (see FIGS. 9A-9B and FIGS. 10A-10B). In the evaluation, pneumatic tires each having a tire size of 315/60R22.5 were respectively assembled on rims each having a rim size of 22.5×9.00. These pneumatic tires were inflated to an air pressure of 900 kPa. In addition, the pneumatic tires were mounted on a front axle of a testing vehicle, which was a 4×2 tractor trailer, with a load of 34.81 kN applied. Then, evaluation was performed after driving the testing vehicle for 100,000 km, by measuring the amount of dropping wear of the shoulder land portions (the difference in the amount of wear of the edge portion of the shoulder land portions and the amount of wear of the outermost circumferential main groove). In this evaluation, a larger value is preferable.

The pneumatic tire 1 of Working Example 1 had the configuration described in FIG. 1 to FIG. 4. In addition, the belt angle of the cross belts 142, 143 was ±19°. Also, the main dimensions were set as follows: TW=275 mm, Gcc=32.8 mm, Dcc=11.2 mm, Ya=446 mm, Wca=320 mm, D2<D1, and D3<D2. The pneumatic tire 1 in each of Working Examples 2 to 22 were modified examples of the pneumatic tires of Working Example 1.

A conventional pneumatic tire had the configuration of FIG. 1 to FIG. 4 with the shoulder land portions 3 having a profile that protrudes outward in the tire radial direction within the ground contact surface.

As shown by the testing results, the pneumatic tire 1 of each of Working Examples 1 to 22 clearly provide improved uneven wear resistance performance for the tire.

What is claimed is:

1. A pneumatic tire, comprising:
   a carcass layer;
   a belt layer arranged on an outer side of the carcass layer in a tire radial direction;
   a tread rubber arranged on an outer side of the belt layer in the tire radial direction;
   at least three circumferential main grooves extending in a tire circumferential direction; and
   a plurality of land portions formed by being partitioned by the circumferential main grooves,
   among the circumferential main grooves, left and right circumferential main grooves on outermost sides in a tire width direction being referred to as outermost circumferential main grooves, and the land portions on an outer side of the outermost circumferential main grooves on left and right sides in the tire width direction being referred to as shoulder land portions,
   the land portions on an inner side of the outermost circumferential main grooves on the left and right sides in the tire width direction having a first profile that protrudes outward in the tire radial direction, and the shoulder land portions having a second profile that protrudes inward in the tire radial direction within a ground contact surface,
   a distance d in the tire radial direction between a line extending from the first profile and the second profile, within the ground contact surface of the shoulder land portions, increasing toward an outer side in the tire width direction, and
   a distance Gcc from a tread profile to a tire inner circumferential surface in a tire equatorial plane and a distance Gsh from a tread end to the tire inner circumferential surface having a relationship such that 1.21≤Gsh/Gcc; wherein
   the belt layer includes a pair of cross belts having belt angles, as an absolute value, of not less than 10° and not more than 45°, the belt angles being of opposite signs,
   upon viewed as a cross-section from a tire meridian direction, a wear end limit surface WE is drawn along the circumferential main grooves, and a cross belt on an outer side in the tire radial direction among the pair of cross belts is referred to as an outer-side cross belt,
   a distance Dcc from the outer-side cross belt to the wear end limit surface WE in the tire equatorial plane and a distance De from the outer-side cross belt to the wear end limit surface WE on a central groove line of the outermost circumferential main grooves have a relationship such that 0.70≤De/Dcc≤1.30, and
   a tread width TW and a total tire width SW have a relationship such that 0.79≤TW/SW≤0.89.

2. The pneumatic tire according to claim 1, wherein a diameter D1 of the first profile in the tire equatorial plane and a diameter D2 of the second profile at a tire ground contact edge have a relationship such that 0.015≤(D1−D2)/D1≤0.015.

3. The pneumatic tire according to claim 1, wherein the diameter D2 of the second profile at the tire ground contact edge and a diameter D3 of the second profile at an edge portion on the inner side of the shoulder land portions in the tire width direction have a relationship such that D3<D2.

4. The pneumatic tire according to claim 1, wherein the belt layer includes the pair of cross belts having the belt angles, as an absolute value, of not less than 10° and not more than 45°, the belt angles being of opposite signs, and a width Wb2 of a wider cross belt among the pair of cross belts and a cross-sectional width Wca of the carcass layer have a relationship such that 0.70≤Wb2/Wca≤0.93.

5. The pneumatic tire according to claim 1, wherein a diameter Ya at a maximum height position on the carcass layer and a diameter Yc at a maximum width position on the carcass layer have a relationship such that 0.80≤Yc/Ya≤0.90.

6. The pneumatic tire according to claim 1, wherein the diameter Ya at the maximum height position on the carcass layer and a diameter Yd of the carcass layer on the central groove line of the outermost circumferential main grooves have a relationship such that 0.95≤Yd/Ya≤1.02.

7. The pneumatic tire according to claim 1, wherein the tread width TW and the cross-sectional width Wca of the carcass layer have a relationship such that 0.82≤TW/Wca≤0.92.

8. The pneumatic tire according to claim 1, wherein the belt layer includes a large-angle belt having a belt angle, as an absolute value, of not less than 45° and not more than 70°.

9. The pneumatic tire according to claim 8, wherein a width Wb1 of the large-angle belt and a width Wb3 of a narrower cross belt among the pair of cross belts have a relationship such that 0.85≤Wb1/Wb3≤1.05.

10. The pneumatic tire according to claim 1, wherein a ground contact width Wsh of the shoulder land portions and the tread width TW have a relationship such that 0.1≤Wsh/TW≤0.2.

11. The pneumatic tire according to claim 1, wherein an actual tire ground contact width Wg and the cross-sectional width Wca of the carcass layer have a relationship such that 0.64≤Wg/Wca≤0.84.

12. The pneumatic tire according to claim 1, wherein a rubber hardness of the tread rubber is within a range of not less than 60.

13. The pneumatic tire according to claim 1, wherein the edge portion of the shoulder land portions has a chamfered portion on a circumferential main groove side.

14. The pneumatic tire according to claim 1, wherein a narrow groove is arranged in a buttress portion and extends in the tire circumferential direction, and upon viewed as a cross-section from the tire meridian direction, the narrow groove is on an outer side of the wear end limit surface WE of the circumferential main grooves in the tire radial direction.

15. The pneumatic tire according to claim 1, wherein the pneumatic tire is a heavy duty tire having an aspect ratio of not more than 70%.

16. The pneumatic tire according to claim 1, wherein a diameter D1 of the first profile in the tire equatorial plane and a diameter D2 of the second profile at a tire ground contact edge have a relationship such that D2<D1.

17. A pneumatic tire, comprising:
a carcass layer;
a belt layer arranged on an outer side of the carcass layer in a tire radial direction;
a tread rubber arranged on an outer side of the belt layer in the tire radial direction;
at least three circumferential main grooves extending in a tire circumferential direction; and
a plurality of land portions formed by being partitioned by the circumferential main grooves,
among the circumferential main grooves, left and right circumferential main grooves on outermost sides in a tire width direction being referred to as outermost circumferential main grooves, and the land portions on an outer side of the outermost circumferential main grooves on left and right sides in the tire width direction being referred to as shoulder land portions,
the land portions on an inner side of the outermost circumferential main grooves on the left and right sides in the tire width direction having a first profile that protrudes outward in the tire radial direction, and the shoulder land portions having a second profile that protrudes inward in the tire radial direction within a ground contact surface,
a distance d in the tire radial direction between a line extending from the first profile and the second profile, within the ground contact surface of the shoulder land portions, increasing toward an outer side in the tire width direction,
a distance Gcc from a tread profile to a tire inner circumferential surface in a tire equatorial plane and a distance Gsh from a tread end to the tire inner circumferential surface having a relationship such that 1.10≤Gsh/Gcc,
the diameter D2 of the second profile at the tire ground contact edge and a diameter D3 of the second profile at an edge portion on the inner side of the shoulder land portions in the tire width direction have a relationship such that D3<D2 and 5.0 mm≤D2−D3≤15.0 mm,
a diameter D1 of the first profile in the tire equatorial plane and the diameter D2 of the second profile at a tire ground contact edge have a relationship such that −0.015≤(D1−D2)/D1≤0.015, and
a tread width TW and a total tire width SW have a relationship such that 0.79≤TW/SW≤0.89.

* * * * *